March 21, 1967 G. ORLOFF 3,310,182
SERVO SYSTEMS AND CONTROL DEVICES THEREFOR
Filed Jan. 12, 1965
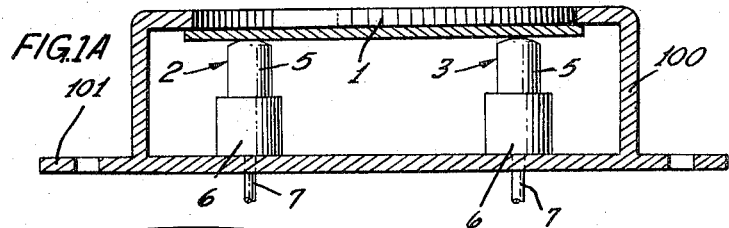
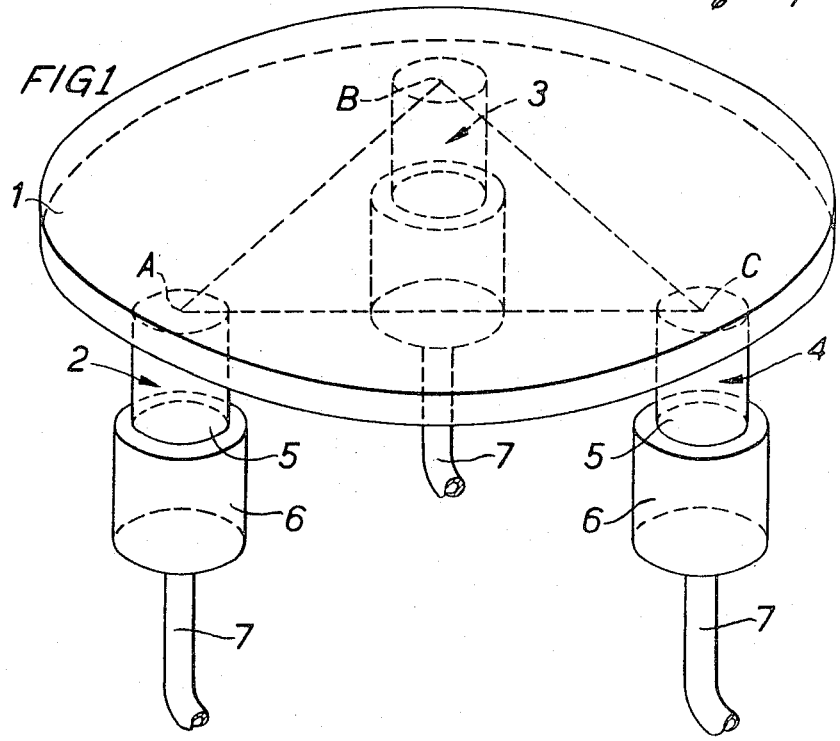
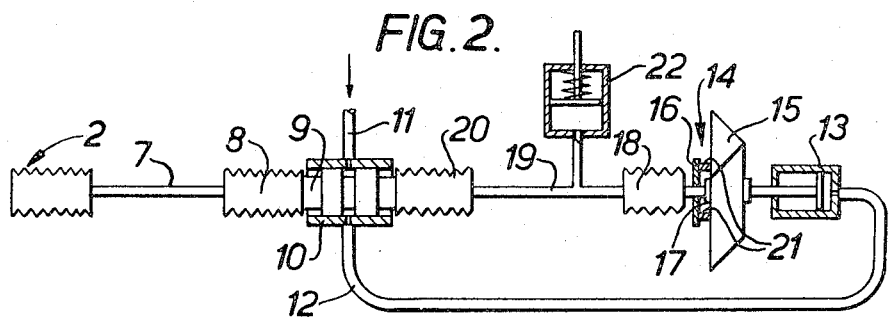
INVENTOR
George Orloff
By Watson, Cole, Grindle & Watson
ATTORNEYS United States Patent Office 3,310,182
Patented Mar. 21, 1967

3,310,182
SERVO SYSTEMS AND CONTROL DEVICES
THEREFOR
George Orloff, London, England, assignor to The Molins
Organisation Limited, London, England, a corporation
of Great Britain
Filed Jan. 12, 1965, Ser. No. 424,951
Claims priority, application Great Britain, Jan. 14, 1964,
1,618/64
2 Claims. (Cl. 214—1)

This invention relates to servo systems for the independent control of multiple functions from a single control member and particularly although by no means exclusively to control devices for such systems.

One advantageous application of systems and devices embodying the invention is in manipulating apparatus for use by persons having less than the normal complement of limbs. For example such a ssytem may allow a mechanical device serving as an artificial hand and arm, and therefore having the three functions of grip, lift and traverse, to be controlled by a single finger. Although the invention may have a variety of other applications, the example cited will be referred to hereinafter to facilitate understanding.

It is an object of the invention to provide an improved hydraulic servo system applicable to such uses as the above. According to the invention there is provided a hydraulic servo system comprising a substantially rigid, substantially plane operating member having freedom to move normal to its plane and to tilt and at least three valve-operating members against which said operating member bears, in which said valve-operating members are disposed in non-aligned relation to one another so that they are engaged by different parts of the operating member whereby application to the operating member of a single force acting normal to its plane will cause actuating forces to be applied to said valve-operating members, the relative magnitudes of said actuating forces being dependent upon the position of application of said single force relative to the positions of said different parts.

The hydraulic system comprises a source of fluid under pressure, a transducer device adapted to develop desired mechanical force in response to application thereto of fluid under pressure, a valve connected to one of the valve-operating members of said control device and operable to open communication between said source and said transducer device, and means for applying said force to said valve in such a sense as to oppose operation thereof. Said valve-operating members are preferably engaged with said disc in a fully symmetrical arrangement, i.e. so that the points of contact or the centres of the areas of contact between the several valve-operating members and the said rear face define the vertices of an equilateral triangle and lie on a circle concentric with the periphery of the said rear face. With such a device, if a rearward force be applied to the front face of the disc, then if for example the point of application is at the centre of the disc, one-third of the applied force will be applied to each valve-operating member; if (as another example) the point of application is on a straight line joining the said points of contact or centres of areas of contact between two of the valve-operating members and the disc, then forces will be applied to those two valve-operating members in a ratio which is the reciprocal of the ratio between the separations of the corresponding points or areas of contact and the point of application, the third valve-operating member being unaffected.

While the valve-operating members may be associated with valves which are operable in one direction only from their rest positions, a device according to the invention may also be employed with valves capable of operation in two mutually opposed directions; in the former case the operating member need only bear against the valve-operating members but in the latter case the operating member is required to be secured to the valve-operating members to permit tensional as well as compressive forces to be transmitted to the valves.

More than three valves and valve-operating members may be employed with a device embodying the invention but the optimum balance between flexibility and complexity is believed to be attained with three valves, except in a case where each valve in excess of three is so disposed that it is always operated with a fixed one of the basic three valves.

A convenient application of a system embodying the invention is in apparatus designed to grip articles. In such apparatus the transducer device conveniently takes the form of a hydraulic jack having a movable part which is urged towards a relatively fixed counter-member upon application of hydraulic pressure to said jack. The counter-member then may include a movable part connected to the valve, so that force applied by the jack to any article placed between the jack and the counter-member is fed back to the valve.

In order that the invention may be well understood, a preferred embodiment thereof will now be described, by way of example only. Preference will be made to the accompanying drawings, in which:

FIGURE 1 is a perspective view of the working parts of a control device for use with three servo systems;

FIGURE 1A is a sectional view of the device of FIGURE 1, complete with its casing; and FIGURE 2 is a diagram of one of the servo systems to be used with the device of FIGURE 1.

The control device shown diagrammatically in FIGURE 1 comprises an operating member in the form of a circular disc 1 having its rear face resting upon three valve-operating members 2, 3, 4. Each of the members 2, 3, 4 is shown as comprising a plunger 5 slidable in a cylinder 6 which in use is connected by a pipe 7 to a hydraulic valve assembly, later to be described with reference to FIGURE 2.

The whole assembly is conveniently contained in a cylindrical casing 100 provided with fixing lugs 101, as shown in FIGURE 1A. The casing 100 serves to retain the disc 1 in contact with the plungers 5 of members 2, 3, 4 (only two of which are visible in FIGURE 1A as this figure is a section on a diameter of disc 1). The disc 1 is free to move bodily downwards in casing 1 or to tilt therein; the position of disc 1 is its normal, unoperated position, to which it is returned by restoring forces exerted by members 2, 3, 4, in normal manner.

It will be seen that the disc 1 actually bears upon the plunger 5 of each of the valve operating members 2, 3, 4. Each plunger 5 is axially reciprocable within its associated cylinder 6, and the axes of the plungers 5 are normal to the faces of disc 1, intersecting each of said faces at points A, B, C which are symmetrically disposed on the disc, i.e. which define on each face the vertices of a notional equilateral triangle concentric with that face, as indicated by dashed lines AB, BC, CA.

If a force is applied to the front face (e.g. by finger pressure) (i.e. the upper face in FIGURE 1) of the disc 1, that force is transmitted to one or more of the plungers 5 of members 2, 3, 4 according to the point of application of said force. If the point of application is point A, then the plunger 5 of member 2 will receive all the applied force, the plungers of members 3, 4 being unaffected as the disc 1 will tend to tilt about line BC (although as indicated above it is preferred that displacements of the plungers in response to applied forces are small, and hence that any such tilt will be small also).

Should the point of application of the force be, say, on line BC, then the disc 1 will tend to tilt about a line through A and parallel to BC; the plunger 5 of member 2 will not be unaffected, but the applied force will be transmitted through the disc 1 to the plungers 5 of members 3 and 4; it will be apparent that the ratio of the forces applied to the plungers of members 3, 4 will be the reciprocal of the ratio of the separations between the axes of these plungers and the normal to the surface of the disc 1 at the point of application of the applied force. All three plungers will be affected if said point of application is within the triangle ABC, the relative magnitude of the forces acting on the several plungers being readily calculable from data defining the position of said point of application relative to points A, B, C.

Turning now to FIGURE 2, a hydraulic servo system is shown, suitable for use in conjunction with any one of the valve-operating members 2, 3, 4 of FIGURE 1. In this example, the member 2 is shown connected as part of the system of FIGURE 2.

In FIGURE 2, the valve-operating member 2 is diagrammatically shown as a bellows unit, connected by the pipe 7 to a further bellows unit 8 (which may, naturally, be in fact a plunger and cylinder assembly also). The two units 2, 8 and their connecting pipe 7 are filled with any suitable liquid in such quantity as to allow either bellows unit to be fully expanded provided the other bellows unit is fully contracted, so that whenever the unit 2 is compressed the unit 8 expands and vice versa. Usually we prefer to arrange that the unit 2 has a larger effective cross-section than the unit 8, so that substantial longitudinal movements may be produced by unit 8 as a result of small movements of unit 2.

The unit 8 has one of its ends abutted against a hydraulic valve member 9 slidable in a cooperating bore of a valve block 10, and longitudinal movement of said member 9 in its block 10 serves in known manner to control communication between an input conduit 11 and an output conduit 12; conduit 11 is connected to a hydraulic pump serving as a source of liquid under pressure, while conduit 12 is connected to a hydraulic jack 13 mounted opposite a counter-member or anvil 14 so that an article such as a mass 15 may be gripped between said jack and anvil.

The anvil 14 comprises a fixed member 16 and floating member 17, the latter being so disposed as to be the part engaged by gripped articles such as the mass 15. A bellows unit 18 so associated with anvil 14 that it is compressed whenever the floating member 17 is urged towards the fixed member 16 by the action of the jack 13 transmitted by the mass 15 or other article. Said bellows unit 18 is connected by a pipe 19 to a further bellows unit 20 bearing against the end of valve member 9 remote from bellows unit 8, the units 18, 20 and pipe 19 being filled with liquid so as to transmit movements and forces from the floating member 17 of anvil 14 to the valve member 9. A mass 21 of resilient material carried on fixed member 16 provides the main support for mass 15, so that only a portion of the force applied to the mass is transmitted to the floating member 17. A pressure accumulator 22 is connected to the pipe 19, to permit adequate movement of valve member 9 when an object to be gripped is such that little or no displacement of floating member 16 is possible.

In operation, a force applied to the plunger 5 of valve-operating member 2, i.e. to bellows unit 2 as represented in FIGURE 2, and consequent small displacement of said plunger, i.e. compression of unit 2, causes a corresponding force and displacement to be applied by bellows unit 8 to valve member 9, which has hitherto been in its normal position, affording no communication between conduit 11 and conduit 12, but which now permits such communication. The jack 13 accordingly receives liquid under pressure and exerts a force on mass 15, which is transmitted by said mass to anvil 14 as the mass 15 is gripped. Through floating member 17 and bellows units 18, 20 a further force is applied to valve member 9, tending to return it to its normal position. It will be seen that the valve member 9 will be constrained to assume a position in which it allows just sufficient hydraulic pressure to be applied to jack 13 for the consequent (and proportional) force applied to valve member 9 by bellows unit 20 to balance the force applied to the other end of the valve member by bellows unit 8. In the result, the force applied to mass 15 is proportional to the force applied to the valve-operating member 2; the constant of proportionality will be dependent upon the ratio of the diameters of bellows units 2, 8 and the ratio of diameter of bellows units 18, 20.

It will be understood that FIGURE 2 is only diagrammatic, in that, for example, a return path will be required to allow liquid to return from jack 13 to the pump.

Various changes or modifications may be made in details of the apparatus described, without departing from the scope of the invention. For example, the accumulator 22 may be omitted if a spring or resilient mass is introduced between floating member 16 and valve member 9, in place of the hydraulic connection shown. Furthermore, if desired the hydraulic connection between the valve-operating member 2 and valve member 9 may be replaced by a mechanical connection and whichever form of connection is employed here, a degree of resilience may be introduced if more travel of the valve-operating member 2 is required to give a desired "feel." The device as shown in FIGURES 1 and 1A is only suitable when the travel of each valve-operating member is small, i.e., the disc 1 can only tilt through small angles.

Where a system embodying the invention is desired to produce displacements rather than apply forces, e.g. in producing traverse of an artificial arm, then we may for example employ the hydraulic pressure controlled by valve member 9 to operate a hydraulic motor to produce rotation of a shaft, and a portion of the force developed may be fed back to the valve member 9 (either through a spring or a hydraulic connection fitted with an accumulator) by fitting a cam to the shaft and a suitable follower, the follower taking the place of floating member 16.

What I claim as my invention and desire to secure by Letters Patent is:

1. A hydraulic servo system comprising a substantially rigid, substantially plane operating member having freedom to move normal to its plane and to tilt, at least three valve-operating members against which said operating member bears, said valve-operating members being disposed in non-aligned relation to one another so that they are engaged by different parts of the operating member whereby application to the operating member of a single force at different positions on the plane member acting normal to its plane will cause actuating forces to be applied in various degrees to said valve-operating members, the relative magnitudes of said actuating forces being dependent upon the position of application of said single force relative to the positions of said different parts;

a source of fluid under pressure, a transducer device adapted to develop desired mechanical force in response to application thereto of fluid under pressure, a valve connected to one of the valve-operating members of said control device and operable to open communication between said source and said transducer device, and means for applying said force to said valve in such a sense as to oppose operation thereof.

2. Article-gripping apparatus including a system as claimed in claim 1, comprising a hydraulic jack serving as the transducer device, a relatively fixed counter-member, a movable part in said jack arranged to be movable towards said counter-member upon application to said jack of fluid under pressure, and a movable part in said counter-member connected to the valve so that force applied by the jack to any article placed between the jack and the counter-member is fed back to the valve.

References Cited by the Examiner
UNITED STATES PATENTS

| | | | |
|---|---|---|---|
| 2,373,745 | 4/1945 | Conway | 60—54.5 |
| 2,484,557 | 10/1949 | Eckman | 91—385 X |
| 2,545,258 | 3/1951 | Cailloux. | |
| 3,021,678 | 2/1962 | Pagley | 60—54.6 |
| 3,030,928 | 4/1962 | Jaquith et al. | 91—386 X |

HUGO O. SCHULZ, *Primary Examiner.*